Figure 1:
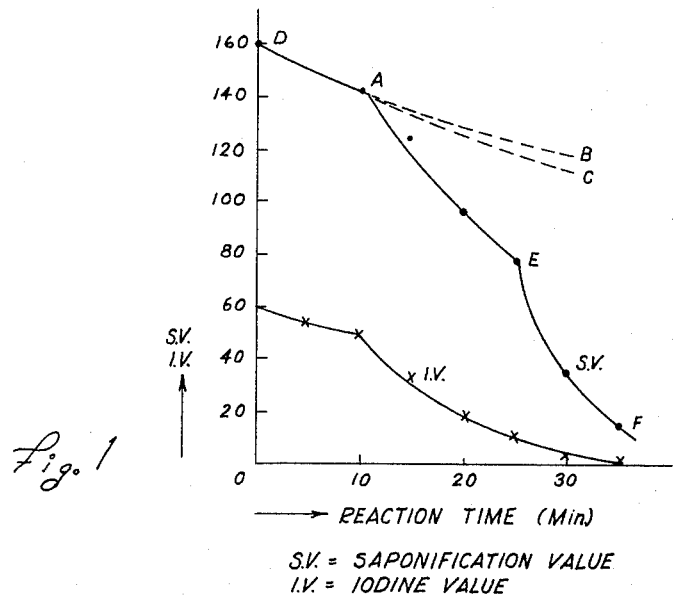

S.V. = SAPONIFICATION VALUE
I.V. = IODINE VALUE

S.V. = SAPONIFICATION VALUE

INVENTOR.
BUNJI MIYA

3,267,157
Patented August 16, 1966

1

3,267,157
HYDROGENATION OF FATTY ACIDS AND LOWER ALKYL ESTERS THEREOF AND ACTIVATION OF COPPER CATALYSTS THEREFOR
Bunji Miya, Wakayama, Japan, assignor to Kao Soap Company, Ltd., Tokyo, Japan, a company of Japan
Filed Oct. 24, 1961, Ser. No. 147,263
Claims priority, application Japan, Oct. 27, 1960, 35/42,724; Mar. 31, 1961, 36/10,749
12 Claims. (Cl. 260—638)

This invention relates to a method of activating catalysts. More particularly the present invention relates to a method of remarkably increasing the activity of copper series catalysts to be used in organic chemical reactions.

There are known methods of activating catalysts wherein a promoter is added, wherein a mixed catalyst is made, wherein a mutually promoted catalyst or an active catalyst is made by mixing two inactive substances and wherein a carrier is used so that the surface area of the catalyst may be increased. However, it usually happens that the activity of such catalysts diminishes during use. The activity of some of such catalysts cannot be restored. The activity of other catalysts can be partially restored, for example, by a method wherein carbon deposited on the surface of the catalyst is oxidized and removed by feeding air thereto. However, in such cases, too, the initial activity will not be completely restored. It is all the more impossible for the activity of the catalyst to attain a value higher than its initial one.

An object of the present invention is to provide a method of increasing the activity of copper series catalysts to be used in organic chemical reactions, specifically in high temperature, high pressure, hydrogen reduction reactions which are used primarily for converting oil and fat series carbonyl radicals into hydroxyl radicals, reducing a fatty acid ester to an alcohol and converting unsaturated bonds to saturated bonds, before or during the reactions, by a new method entirely different from the methods mentioned above.

In a hydrogen reduction reaction for converting an oil and fat series carbonyl radical into a hydroxyl radical or a reaction for reducing a fatty acid ester to an alcohol and converting unsaturated bonds to saturated bonds, such low boiling point compounds as water, menthanol, ethanol, n- or i-propanol or n-, i-, sec- or tert-butanol will be produced during the reaction. I have discovered that when either (1) the low boiling point compound produced during such reaction is discharged out of the reaction system together with hydrogen at the time of a high temperature in the reaction system, or (2) when a low boiling point compound (which may be identical with or different from the one produced by the reaction) is added to the reaction material in advance and is discharged out of the reaction system together with hydrogen or hydrogen and the low boiling point compound produced by the reaction at the time of a high temperature in the reaction system, the activity of the copper series catalyst used in the reaction will be remarkably increased. The low boiling point compound and the hydrogen are removed from the reaction system by flashing, that is, by opening a valve

2 to place the pressure vessel in communication with the atmosphere. That is to say, according to the present invention, when a low boiling point compound (which has been produced by the reaction and/or added in advance to the reaction material) is taken out of the reaction system together with hydrogen at the time of high temperature before or during the reaction and then fresh hydrogen is immediately passed into the reaction system, the subsequent reaction velocity will be quickly increased. According to my researches, such increase of the reduction reaction velocity is due to the activation of the copper series catalyst or the increase in the activity of such catalyst caused by the discharge of the low boiling point compound together with hydrogen out of the system at the time of a high temperature in the system. The reaction velocity, after the activation of the catalyst according to the present invention is carried out, will be several times as high as would be the case if such activation were not carried out. Further, when such treatment is repeated, the reaction velocity will increase still further. In Example 2, discussed hereinafter, when a treatment according to the invention was carried out twice, the reaction velocity became 13.3 times as high as is was before such treatments. When the amount of the low boiling point compound added to the reaction material in advance is increased, the reaction velocity will further increase. Thus, in Example 3, discussed hereinafter, the reaction velocity reached the surprising value of 23 times as high as it was before undergoing the treatment according to the invention.

The mechanism by which the surprising phenomenon described above occurs in the method of activating catalysts according to the present invention is not yet known. However, the facts thus far known are the follows.

Adkins' catalyst (H. Adkins and R. Connor, J. Am. Chem. Soc., 53, 1091 (1931)) utilized in Example 1 is said to have a composition of $CuO \cdot CuCr_2O_4$. When it is used in the presence of high pressure hydrogen, the oxygen in the catalyst will combine with the hydrogen so as to form water. This water is considered to be adsorbed on the surface of the catalyst and to inhibit the reaction. However, as shown in Example 2, in the case where a copper soap is used as the catalyst, the reaction velocity will increase due to the discharge of hydrogen and the low boiling point compound according to the invention. Therefore, the increase of the reaction velocity is not due to the removal of the adsorbed water because the copper soap will be changed into a fatty acid and copper by the high pressure hydrogen and the copper will act as a catalyst but in said reaction between copper soap and hydrogen no water will be produced and, therefore, no water is considered to be adsorbed on the surface of the catalyst.

It may also be considered that the reaction material may have contained a catalyst poison which is taken out of the system simultaneously with the discharge of hydrogen and this causes the increase in the reaction velocity. However, even when a reaction material, which has previously been subjected to an operation for removing catalyst poisons, is used, the reaction velocity will be increased by the above described treatment according to the invention. Therefore, the reaction velocity is not considered to be increased by the removal of the catalyst poison. It may also be considered that, since Akins' catalyst is kept in air after being prepared, it will adsorb air while so being kept and the air will be removed by the discharge of hydrogen according to the invention and this will cause the reaction velocity to be increased. However where a copper soap is to be used as the catalyst, the catalyst will be used without any chance of coming into contact with air. Therefore, it is evident that the increase of the reaction velocity is not due to the removal of air. Further, in order to directly prove it, air and water thought to have been adsorbed on the surface of Adkins' catalyst were removed by treating the catalyst in a high vacuum at 250 to 260° C. for 3 hours. No increase in the reaction velocity resulted from this treatment.

The present invention will now be further explained by reference to several examples. However, the present invention is not limited to the subject matter of these examples.

FIGURES 1 to 6 of the accompanying drawings are diagrams illustrating the reaction velocities as described in Examples 1 to 6, respectively.

*Example 1*

150 g. of a rape seed fatty acid methyl ester with the addition of 4.5 g. of an Adkins' type copper-chromium catalyst were made to react at a temperature of 275° C. under a hydrogen pressure of 120 atmospheres in an autoclave. The ester was reduced to higher alcohols and at the same time a double bond was saturated. As shown in FIGURE 1, at points A and E, respectively, 10 and 25 minutes after the reaction started, the hydrogen was discharged and the methanol produced by the reaction was taken out of the system and then fresh hydrogen was immediately passed into the system. This operation was repeated twice as shown in the diagram at 10 and 25 minutes, and the reaction was continued. The rate of decrease of the saponification value (S.V.) and iodine value (I.V.) increased after each discharging operation.

In general, in a chemical reaction, if the reaction product is taken out of the system, the reaction will become quicker. In the present reaction, too, since methanol which was one of the reaction products was taken out of the system together with hydrogen, the reaction should become somewhat quicker. However, as seen in FIGURE 1, it is evident that the increase of the reaction velocity by the present activating method was not primarily due to the removal of methanol.

Now, considering the saponification value, it was calculated that, if hydrogen had not been discharged, the reaction should have progressed in accordance with the curve AB. The decrease of the saponification value when both methanol and hydrogen were taken out of the system should not come below the curve AC, where AC is a curve parallel to DA. In fact, where the procedure of the invention is used, the saponification value reduction curve will be like AE and EF, respectively. If the primary reaction velocity constant is 1 between D and A, it will reach such surprising value as 3.2 between A and E 13.3 between E and F.

The rape seed fatty acid methyl ester used in this example had been prepared by a process wherein the material was held at 275° C. under a hydrogen pressure of 10 atmospheres using 3% Adkins' catalyst. Hydrogen was discharged and then hydrogen was passed in again. Such operation was repeated three times and then the ester was separated from the catalyst by filtration. This operation removed any catalyst poison which might have been present in the rape seed fatty acid methyl ester.

*Example 2*

Figure 2:
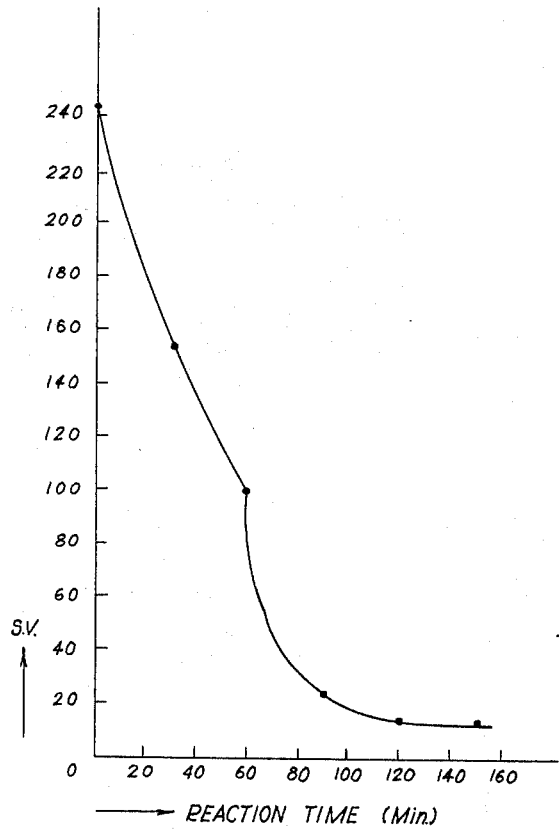

96 g. of a coconut oil fatty acid with the addition of 20% by weight (19.3 g.) copper soap of the same fatty acid as a catalyst were made to react at a temperature of 275° C. under a hydrogen pressure of 120 atmospheres. When the reaction material was treated by discharging hydrogen and the low boiling compound at 60 minutes, the rate of decrease of the saponification value increased markedly as shown in FIGURE 2. In such case, the low boiling point compound coming out of the system simultaneously with the discharge of hydrogen was water.

*Example 3*

Figure 3:
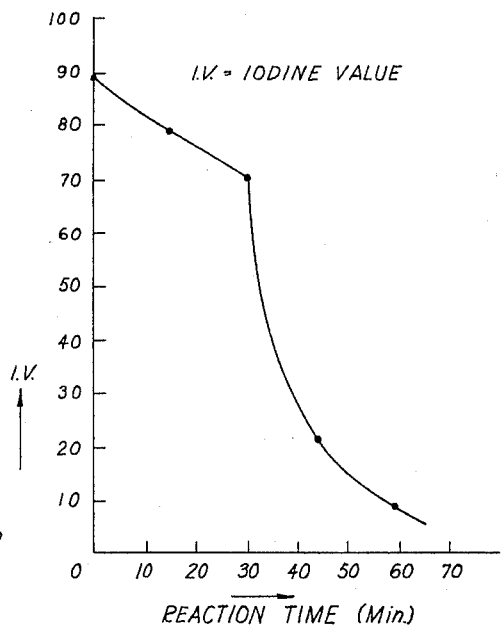

150 g. of a rape seed oil fatty acid methyl ester with the addition of 8 g. of methanol and 5 g. of a Raney's type copper catalyst were made to react at 205° C. under a hydrogen pressure of 120 atmospheres. Raney copper catalyst is a porous copper powder made by leaching the aluminum from an alloy of Al-Cu with caustic soda solutions. At a reaction time of 30 minutes, the methanol was removed from the system together with hydrogen. Hydrogen was then passed into the solution and the reaction was continued. The rate of decrease of the iodine value in such case was as shown in FIGURE 3. The reaction velocity after the discharge of hydrogen was 23 times as high as before the discharge.

*Example 4*

Figure 4:
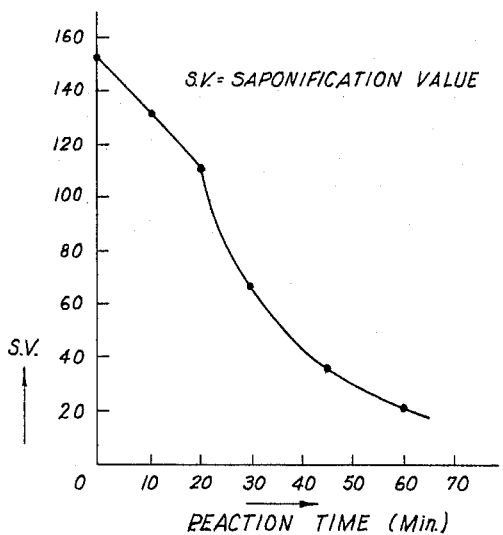
Figure 5:
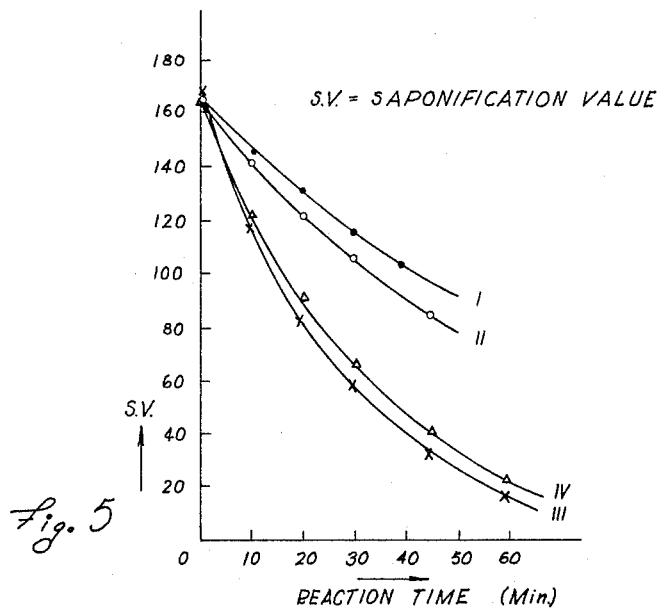
Figure 6:
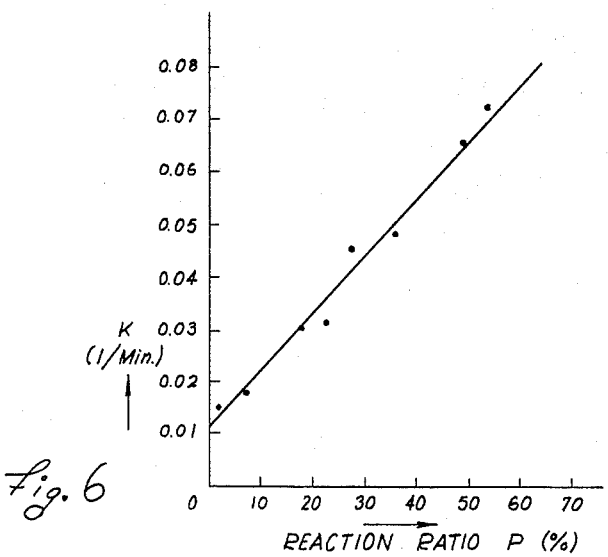

A rape seed oil fatty acid butyl ester was reduced under the same condition as in Example 1. The butanol produced during the reaction was discharged together with hydrogen after a reaction time of 20 minutes and then the reaction was again continued. As shown in FIGURE 4, the velocity of the reaction after 20 minutes increased markedly. The catalyst used here had been treated at 250 to 260° C. under a high vacuum for 3 hours so that air and water which might have been adsorbed in the catalyst would have been removed.

*Example 5*

150 g. of a rape seed oil fatty acid methyl ester with the addition of 3% by weight (4.5 g.) copper-chromium catalyst were reduced at 275° C. under 120 atmospheres. The manner of decrease of the saponification value was as shown in the curve I in FIGURE 5. Where hydrogen was discharged at a reaction time of 0 minute, that is, at the time the reaction temperature was reached, under the same conditions, the rate of decrease of the saponification value was almost the same as in the curve I. Where 4 g. of methanol was added to the material before the reaction started, the velocity was as shown in the curve II and the rate of decrease was a little higher than in the curve I. Curve III illustrates the rate of change of the saponification value when 4 g. of methanol were added to the material and the methanol was discharged together with hydrogen at a reaction time of 0 minute. The velocity constant was about 3 times as high as in the case of the curve I. Curve IV illustrates the rate of change of the saponification value when acetone was put in instead of methanol and the reduction was made under the same condition as in the case of the curve III. In this case, too, the increase of the activity of the catalyst was recognized. As understood from this example, the main cause of increasing the activity of the catalyst is the discharge of the low boiling point compound together with hydrogen while hot.

*Example 6*

150 g. of a rape seed fatty acid methyl ester with the addition of 3 g. of a copper-chromium catalyst were made to react at a temperature of 275° C. under a hydrogen pressure of 120 atmospheres. When the methanol produced when the reaction had progressed P% toward completion was discharged, the subsequent reaction velocity constant K became larger. In the reduction reaction, the rate of decrease of the saponification value was in the first order with respect to the saponification value and the velocity constant was represented by K. When P and K were ploted, a linear relation was obtained as in FIGURE 6. That is to say, the amount of methanol removed was directly proportional to the degree of the activation of the catalyst.

As understood from the above examples, the term "copper series catalysts," as used in the specification and claims, refers to members of the group consisting of copper-chromium catalysts, Raney copper catalysts, fatty acid copper soaps and reduced copper catalysts. The substances which can be subjected to the high temperature high pressure hydrogen reduction using these catalysts include fatty acids, such as a coconut oil fatty acid, and fatty acid esters, such as a rape seed oil fatty acid methyl ester, ethyl ester and butyl ester. The term "low boiling point compounds" shall be used in the specification and claims to refer to members selected from the group consisting of water, methanol, ethanol, propanol and butanol. In the reactions for subjecting such substances to the high temperature, high pressure hydrogen reduction, the activity of such copper series catalysts as are mentioned above can be remarkably increased as shown in the above examples. The low boiling point compounds produced in such reactions are chiefly methanol, ethanol, water, n- and i-propanols and n-, i-, sec- and tert-butanols. That is to say, the low boiling point compound produced during such reaction is taken out of the system together with hydrogen by discharging hydrogen at the time of the high temperature reaction. This is the "hydrogen discharge" so-called in the present invention. In the case where a low boiling point compound is added to the reaction material in advance and is heated to a high temperature and then hydrogen is discharged before the reaction starts or hydrogen is discharged together with the low boiling point compound produced during the reaction at a high temperature, the low boiling point compound added may be identical with or different from the one produced during the reaction and not only the above mentioned water and alcohols but also acetone and others can be used.

As regards the amount of the low boiling point compound which can be added to the reaction material before hydrogen reduction, in the present invention 1 to 15% by weight, particularly, 2 to 5% by weight methanol for a fatty acid or fatty acid ester, is usually preferable. In this range, the increase of the reaction velocity after hydrogen is discharged will be substantially proportional to the amount of the low boiling point compound added. Larger amounts of the low boiling point compound can be used but the reaction velocity will not increase proportionately.

In the hydrogen reduction reaction, in which the catalyst activating method of the present invention may be used, the reaction velocity will become high in direct proportion to the hydrogen pressure. It is known that the reduction reaction can be carried out even at pressures as low as several atmospheres. In the present invention, for example, if the catalyst activity is 10 times as high, the reaction which has been carried out at 100 atmospheres will be able to be carried out at 10 atmospheres. Therefore, in the present invention, if the hydrogen pressure after hydrogen is discharged is above 5 atmospheres, the carbonyl reduction reaction can be carried out at a satisfactory rate. A high temperature, as 150 to 350° C. is proper for the reaction temperature after the hydrogen discharge is carried out. Above 350° C., the organic substance will be markedly decomposed. Below 150° C., the reaction velocity will become so low as to be unacceptable. The proper temperature when the hydrogen discharge is to be carried out should be the same as the above or 150 to 350° C.

What is claimed is:
1. A method of catalytically hydrogenating fatty material selected from the group consisting of fatty acids and lower alkyl esters of fatty acids in a high temperature, high pressure, hydrogen reduction reaction, which comprises:
introducing into a reaction system said fatty material, hydrogen, a low boiling point compound and a copper series catalyst selected from the group consisting of copper-chromium catalysts, Raney copper catalysts, fatty acid copper soaps and reduced copper catalysts;
pressurizing the reaction system to maintain a high pressure suitable for the hydrogen reduction reaction and heating the reaction system to a temperature of from 150° C. to 350° C. suitable for the hydrogen reduction reaction;
at a selected time when the reaction system is at said high temperature and pressure, opening valve means in the reaction system to place the reaction system in communication with a receiver at a lower pressure than the reaction system and thereby discharging from the reaction system into the receiver hydrogen and said low boiling point compound and simultaneously reducing the pressure in the reaction system in order to increase the activity of the catalyst, the other materials remaining in the reaction system; and
immediately thereafter closing said valve means and introducing fresh hydrogen into the reaction system to restore the pressure therein to said high value so that the hydrogen reduction reaction can resume and proceed at a rapid rate.
2. A method according to claim 1 in which the lower boiling point compound introduced into the reaction system along with the other materials is methanol.
3. A method according to claim 1 in which the lower boiling point compound introduced into the reaction system along with the other materials is ethanol.
4. A method according to claim 1 in which the lower boiling point compound introduced into the reaction system along with the other materials is propanol.
5. A method according to claim 1 in which the lower boiling point compound introduced into the reaction system along with the other materials is water.
6. A method according to claim 1 in which the lower boiling point compound introduced into the reaction system along with the other materials is butanol.
7. A method according to claim 1 in which the lower boiling point compound introduced into the reaction system along with the other materials is acetone.
8. A method of catalytically hydrogenating fatty material selected from the group consisting of fatty acids and lower alkyl esters of fatty acids in a high temperature, high pressure, hydrogen reduction reaction, which comprises:
introducing into a reaction system said fatty material, hydrogen and a copper series catalyst selected from the group consisting of copper-chromium catalysts, Raney copper catalysts, faty acid copper soaps and reduced copper catalysts;
pressurizing the reaction system to maintain a high pressure suitable for the hydrogen reduction reaction and heating the reaction system to a temperature of from 150° C. to 350° C. suitable for the hydrogen reduction reaction;
allowing the hydrogen reduction reaction to proceed at such temperature and pressure so that a low boiling point compound is formed and interrupting the reaction by opening valve means in the reaction system to place the reaction system in communication with a receiver at a lower pressure than the reaction system and thereby discharging from the reaction system into the receiver hydrogen and said low boiling point compound and simultaneously reducing the presusre in the reaction system in order to increase the activity of the catalyst, the other materials remaining in the reaction system; and
immediately thereafter closing said valve means and introducing fresh hydrogen into the reaction system to restore the pressure therein to said high value so that the hydrogen reduction reaction can resume and proceed at a rapid rate.
9. A method according to claim 8 in which the fatty material consists essentially of an aliphatic fatty acid methyl ester and the methanol produced by the reaction is discharged from the reaction system together with the hydrogen.

10. A method according to claim 8 in which the fatty material consists essentially of an aliphatic fatty acid propyl ester and the propanol produced by the reaction is discharged out of the reaction system together with the hydrogen.

11. A method according to claim 8 in which the fatty material consists essentially of an aliphatic fatty acid butyl ester and the butanol produced by the reaction is discharged out of the reaction system together with the hydrogen.

12. A method according to claim 8, in which the fatty material consists essentially of an aliphatic fatty acid and the water produced by the reaction is discharged out of the reaction system together with the hydrogen.

References Cited by the Examiner
UNITED STATES PATENTS

| | | | |
|---|---|---|---|
| 2,597,074 | 5/1952 | Bartholomaeis et al. | 260—638 |
| 2,750,429 | 6/1956 | Nora et al. | 260—638 |
| 2,876,265 | 3/1959 | Braconier et al. | 260—638 |

LEON ZITVER, *Primary Examiner.*

MAURICE A. BRINDISI, *Examiner.*

R. D. EDMONDS, J. E. EVANS, *Assistant Examiners.*